Patented May 22, 1951

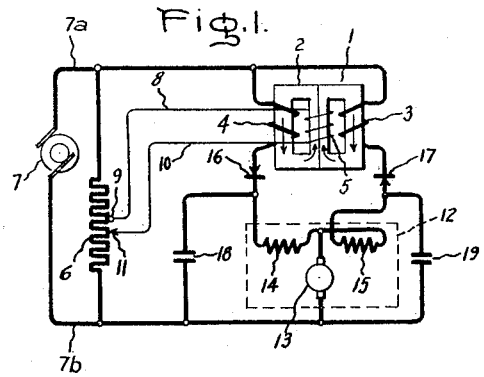

2,554,203

UNITED STATES PATENT OFFICE 2,554,203

MAGNETIC AMPLIFIER CONTROL SYSTEM

Raymond E. Morgan, Scotia, N. Y., assignor to General Electric Company, a corporation of New York Application November 10, 1949, Serial No. 126,559

11 Claims. (Cl. 323—89)

My invention relates to electrical control systems and more particularly to control systems which include magnetic amplifiers as elements thereof.

The magnetic amplifiers utilized in such control systems have commonly been of two general types. In one type, a pair of reactance windings of a saturable reactor are arranged and connected in a circuit so that they tend to produce a reversal of flux in the core during alternate half cycles with respect to the flux produced by a saturation control winding of the reactor. In the other type, the reactance windings are arranged and connected so that they produce a flux in the reactor which is unidirectional with respect to the flux produced by the control winding. Although much greater amplification is normally produced by this latter "self-saturating" type of magnetic amplifier, the control of the circuit is usually limited to a signal of slowly variable unidirectional current, and it is necessary, therefore, to convert the source alternating voltage into a unidirectional signal current before it is applied to the control windings of the reactor.

In many control applications however, such as in Selsyn controlled servo systems, it is highly desirable to employ a magnetic amplifier circuit which is responsive to the amplitude and sense of an alternating current signal derived from the available alternating voltage source. In addition, the consumption circuit of such control systems is usually amenable only to unidirectional currents or voltages, and it is, therefore, also desirable that the output current produced by the magnetic amplifier circuit be unidirectional in character.

Accordingly, one of the principal objects of my invention is to provide a magnetic amplifier control system of extremely high sensitivity which utilizes an alternating current control signal which may be directly derived from the alternating current power source of the control system.

Another object of my invention is to provide a magnetic amplifier control system wherein the output current through a consumption circuit or device is unidirectional in character and yet is responsive in amplitude and polarity to the amplitude and sense of an alternating current signal.

A further more specific object of my invention is to provide a simple and improved magnetic amplifier circuit adapted to receive the alternating current output of a Selsyn control system and to convert that output into a highly amplified and representative unidirectional signal such as may be used, for example, to indicate the position of the principal rotor of the Selsyn system or even to control a radar antenna servo system.

In accordance with one embodiment of my invention, I provide a control system wherein the magnetic amplifier includes a saturable core member having a pair of reactance windings and a control winding. The control winding is connected to receive an alternating signal of variable amplitude which is derived from an alternating voltage power source. Each reactance winding is also respectively connected across this alternating voltage source through a separate current rectifying device and a separate series load impedance which may, for example, be one half of a magnetic excitation winding, such as the split field winding of a dynamo-electric machine or the split control winding of a further stage of magnetic amplification. The rectifying devices are oppositely poled so that current flows through each reactance winding circuit during alternate half cycles, and filtering means are included to obtain a unidirectional component of the resultant current pulses through each series load impedance. Since the direction of the control flux in the reactor due to the control winding changes during each half cycle of supply voltage in accordance with the amplitude and polarity of the alternating signal, there is a corresponding variation in the amount of filtered unidirectional current flowing through each load impedance; and if the load impedances constitute the split magnetic excitation windings of an electromagnetic device connected in flux opposition, the total flux produced in the load is proportional to the differential of the separate half load direct current components. It will be readily appreciated that the direction of this differential direct current component will be determined by the "sense" or "polarity" of the alternating current signal with respect to the alternating voltage source.

In a modification of my invention each series load impedance is connected in a balancing circuit in order that the differential of current flowing through each load impedance may be utilized to control an ultimate direct current consumption device of any common type.

The novel features which I believe to be characteristic of my invention are set forth with particularity in the appended claims. My invention itself, however, together with further objects and advantages thereof can best be understood by reference to the following description taken in connection with the accompanying drawings in which Fig. 1 is a schematic circuit diagram of my invention as applied to a load comprising the split field winding of an electromagnetic device, Fig. 2 is a circuit diagram of a modification of my invention whereby it may be employed with any common type of electrical load, Fig. 3 is a circuit diagram showing my invention in conjunction with a Selsyn control system and applied to a further stage of magnetic amplification, Fig. 4 and Fig. 5 are modifications of the circuit of Fig. 3 showing various filtering arrangements and Fig. 6 is a group of curves explanatory of the operation of my invention. In the various figures similar reference numerals indicate similar circuit elements.

Referring to Fig. 1, I have shown my invention as comprising a saturable reactor 1 having a highly permeable core member 2, preferably of the split three-legged type, as indicated, with a pair of reactance windings 3 and 4 respectively wound on the outer legs of the core 2. These reactance windings 3, 4 are wound and connected in separate alternating current circuits so that flux flows in the same direction through the center leg of the core, as indicated by the arrows, when current in one reactance winding is flowing in a direction opposite to the current in the other reactance winding. A saturation control winding 5 is wound on the center leg of the core and connected to receive an alternating current signal derived from the available alternating voltage source. In Fig. 1 this alternating signal is derived by virtue of a voltage dividing network comprising a potentiometer 6 connected across a pair of alternating voltage supplying conductors 7a and 7b to a source of alternating voltage 7. One control winding lead 8 is connected to a fixed center tap 9 of the potentiometer 6 while the other control winding lead 10 is connected to a variable tap 11 of the potentiometer. It is evident, of course, that many other variable impedance means, such as a variable tap transformer, may alternatively be employed to supply an alternating current signal to the control winding 5.

In order to obtain a proper half cycle discriminatory action, each reactance winding is connected in series relation across the alternating voltage source 7 through a separate current rectifying device and one half of a magnetic excitation winding of an electromagnetic device. In Fig. 1, I have shown my invention in conjunction with an electromagnetic device 12 comprising a reversible motor 13 having a pair of excitation field windings 14 and 15 respectively, which are wound and connected in their associated circuits to produce a flux opposition in the motor so that the motor is energized by the total differential flux produced by the windings. One lead of the reactance winding 4, of the reactor 2 is connected to one side 7a of the alternating source 7 while the other lead of the reactance winding 4 is connected through a current rectifying device 16 to one end of the field winding 14. The alternating current circuit of the reactance winding 4 is completed by connections from the other end of the field winding 14 through the motor armature to the opposite side 7b of the alternating voltage source 7. The other reactance winding 3 of the reactor 1 is similarly connected across the alternating voltage source 7 through a current rectifying device 17 and the field winding 15. As indicated by Fig. 1, the current rectifying devices 16 and 17 are reversely connected so as to be oppositely poled with respect to the alternating voltage source 7 with the result that current flows through each reactance winding series circuit during alternate half cycles of source voltage only.

Since the current pulses through each field winding 14, 15 occur during alternate half cycle periods of time, it is necessary to include filtering means in each circuit to obtain a unidirectional component of the current pulses through each field winding and thereby to enable the electromagnetic load device to be energized by the flux produced by the differential direct current component flowing therein as will be more fully explained hereinafter. In the circuit of Fig. 1 such filtering means are provided by a pair of capacitors 18 and 19 respectively connected across each field winding 14, 15 to side 7b of the alternating voltage source 7.

Referring now to Fig. 2, I have shown a modification of my invention whereby it may be employed with any two-terminal type of direct current consumption device. The circuit is similar to that of Fig. 1 with the exception that the field windings 14, 15 of Fig. 1 are replaced by a bridge-type network of impedance elements and the direct current consumption device is connected as one diagonal of the bridge. More specifically, the reactance winding 4 of the reactor 2 and the rectifier 16 are directly connected across the alternating voltage source 7 through a series impedance, such as resistor 20; while the reactance winding 3 of the reactor 1 and the rectifier 17 are connected across the source 7 through an impedance, such as resistor 21 whose impedance is substantially identical to the impedance of resistor 20. Connected in series between corresponding impedance points 22 in each of these reactance winding circuits are a pair of equivalent balancing resistors 23 and 24 respectively. A direct current consumption device 25, which may, for example, be a simple direct current motor, is connected from the point of connection between resistors 23 and 24 to side 7b of the alternating current source 7. Filtering is preferably accomplished by connecting capacitors 18, 19 across resistors 20 and 21 as shown.

Referring now to Fig. 3, I have shown my invention as applied to a self-synchronous Selsyn system in conjunction with a load comprising a further stage of magnetic amplification. The variable alternating current signal for the control winding 5 of the saturable reactor 1 is derived from a pair of Selsyns 26 and 27 connected across the alternating voltage source 7 in a conventional manner so that the polarity and magnitude of the alternating output signal is a function of the relative direction and amount of displacement between a fixed rotor 28 and a movable rotor 29 of the two Selsyns. A pair of oppositely wound control windings 30 and 31 of a second saturable reactor 32 replace the field windings 14, 15 of Fig. 1, and comprise the independent loads for the reactance winding circuits of the reactor 1. The reactance winding 3 and rectifier 16 are connected in series across the alternating voltage source 7 through one control winding 31 while the reactance winding 4 and rectifier 17 are connected across the source 7 through the other control winding 30. The second saturable reactor 32 is preferably connected as the control element of a stage of direct current controlled magnetic amplification of the type described and claimed in my U. S. Patent application No. 94,577, filed May 21, 1949, now abandoned, and assigned to the same assignee as the present invention. In this latter magnetic amplifier circuit a pair of reactance windings 33 and 34 of the reactor 32 are connected in series with a pair of oppositely poled current rectifying elements 35, 36 to form one pair of opposing arms of a bridge type rectification circuit 37 connected across the alternating voltage source 7. Another pair of oppositely poled rectifying elements 38, 39 form the balancing arms of the bridge and a direct current consumption circuit or load 40 is connected as the diagonal of the bridge 37.

In this control circuit of Fig. 3 it will be appreciated that filtering to obtain a direct current component of the successive current pulses flowing through the control windings 30, 31 may be very easily accomplished by merely winding a few short-circuited turns 41 around the control winding core leg as indicated. As is well known in the art, sufficient inductance and resistance may be introduced by these short-circuited turns 41 to maintain a unidirectional component of the control flux in the core. Alternative means for providing proper filtering of the current flowing in the control windings 30, 31 are illustrated in Figs. 4 and 5.

In Fig. 4 filtering is accomplished by virtue of a pair of resistors 42, 43 and a pair of capacitors 44 and 45. Resistor 42 is connected in series relation with rectifier 17 and control winding 30 while resistor 43 is connected between rectifier 16 and control winding 31. Each of the capacitors 44, 45 is separately connected from the point of connection between the rectifiers 16, 17 and the resistors 42, 43 to lead 7b of the alternating voltage source 7. The remainder of the circuit of Fig. 4 is identical to that of Fig. 3.

In Fig. 5 an inductance-resistance type filter is used. An inductance 46 and a resistor 47 are connected in series relation with each reactance load winding circuit. In this circuit, however, additional current rectification elements 48 and 49 must be included as commutating devices to by-pass the inductively produced current in each circuit during alternate half cycles in which the circuit would normally be non-conductive. These commutating rectification elements 48, 49 are preferably connected from the point of connection to each inductance-resistance filter network to side 7b of the alternating voltage source. The polarity of rectifiers 48, 49 is such as to oppose the polarity of the load current carrying rectification elements 16 and 17. The remainder of the circuit of Fig. 5 is identical to that of Fig. 3.

The operation of my invention may best be understood by reference to the curves of Fig. 6. The simple sinusoidal curve A represents the voltage output of the alternating voltage source 7 as plotted against time. Assume, for the moment, that there is no signal on the control winding of the saturable reactor 1 of any of the circuits shown in Figs. 1 through 5. Under these conditions, as the source voltage begins its positive half cycle, the current in one of the reactance windings, such as the reactance winding 3, produces an increasing magnetic flux in the core until the saturation point of the core is reached. While the flux is increasing substantially all of the source voltage is dissipated across the reactance winding 3 because of the high permeability of the core, and practically no current flows in the particular half load circuit connected in series with the reactance winding 3 across the alternating voltage source 7. Due to the sharp knee of the magnetization curve, the core goes from maximum permeability to the permeability of air in approximately 5 electrical degrees of the alternating current cycle. After saturation, the current delivered through this half load circuit is limited only by the air core inductance of the reactance winding 3 and the impedance of the half load itself. Thereafter, as illustrated by curve B of Fig. 6, the load current substantially follows the source voltage until this source voltage returns to zero at the end of its positive half cycle. After the zero voltage point is reached, the rectifier 16 stops the current and the flux returns to zero during the following negative alternation of source voltage. During this following alternation, the opposite reactance winding 4 and its associated half load circuit repeats the above described operation with the result that the current flows through one half load during a portion of the positive half cycle and through the other half load through a portion of the negative half cycle, as indicated in Fig. 6.

In the control systems illustrated in Figs. 1, 3, 4 and 5, the half-load circuit respectively connected in series with each reactance winding comprises one of a pair of magnetic excitation windings properly wound and connected in the circuit so that the flux produced by the current pulse in one magnetic excitation winding tends to "buck" or "oppose" the flux produced by the current pulse flowing through the other magnetic excitation winding. However, since the current pulses through the respective magnetic excitation windings, as explained above, occur during alternate half cycles of the source voltage, I include filtering means in each circuit whereby a unidirectional component of the successive current pulses is obtained in order to enable the flux produced in each magnetic excitation winding to be compared. It will be readily appreciated that with no signal upon the control winding of the reactor 1, there will be a complete cancellation of flux in the oppositely connected magnetic excitation windings and there will be no resultant magnetic field to energize the electromagnetic load device incorporating these magnetic excitation windings.

If an alternating current signal which is in phase with the source voltage is now applied to the control winding of the reactor 1, as illustrated by the dashed line curve c of Fig. 6, it is apparent that the flux produced in the magnetic core 2 by the control winding will aid the flux produced by one of the reactance windings during one alternation of supply voltage but will oppose the flux produced by the other reactance winding during the succeeding alternation. If the control winding flux aids the reactance winding flux, the core reaches saturation at an earlier point during the cycle and the associated half-load circuit current is increased. Conversely, a bucking action between the control winding flux and the reactance winding flux delays the saturation point, and the resultant current in the associated half load circuit is decreased. Consequently, with an alternating current signal, current pulses of unequal magnitude pass through each half load circuit during alternate half-cycles as indicated by dashed curve d of Fig. 6. Since the unidirectional components of these unequal current pulses, as represented by the lines x and y of Fig. 6, are filtered in each circuit, the flux produced in each magnetic excitation winding by these filtered currents does not cancel, and a resultant field is produced in the electromagnetic device whose strength is proportional to the differential current produced across both magnetic excitation windings as indicated by the magnitude z of Fig. 6.

It is also evident that if an alternating current signal of opposite "sense" i. e., 180° out-of-phase, to the source voltage is supplied to the control winding 5 of reactor 1 as indicated by the dotted curve e of Fig. 6, the flux produced by the control winding 5 has an opposite direction with reference to the flux produced by the conducting reactance windings than the direction occurring during the in-phase alternating current signal condition discussed above. If the in-phase signal control flux had aided the flux of a particular conducting reactance winding, such as winding 3, during the positive half cycle of signal voltage and had opposed the flux of winding 4 during the negative half cycle of signal voltage, then the 180° "out-of-phase" signal control flux now opposes the flux of the reactance winding 3 during the positive half cycle and aids the flux of reactance winding 4 during the negative half cycle. As a result the predominance of half load circuit current shifts to the opposite side of the total split load as indicated by the dotted curve f of Fig. 6, and the direction of the resultant energizing field in the load is opposite to that produced during an in-phase signal.

It is therefore apparent that the magnitude of the differential field in the electromagnetic device employed as the load is dependent upon the amplitude of the alternating current signal applied to the control winding 5 of the reactor 1, and the direction of the field is dependent upon the sense of this alternating current signal.

It will be appreciated that the above discussion of the operation of my invention applies in general to the control circuits of Figs. 1, 3, 4 and 5 in which a pair of differentially connected magnetic excitation windings are utilized as the immediate load upon the saturable reactor 1. Referring more particularly to each circuit, in Fig. 1 the potentiometer 6 functions as a voltage divider to impress an alternating signal through control winding 5 whose amplitude is proportional to the distance between the center tap connection 9 and the variable tap connection 11, and whose sense is dependent upon which side of the fixed center tap 9 the variable tap 11 is located. The filter capacitors 18 and 19 are charged during the period of current conduction in their associated reactance winding circuits and discharged during the period of non-conduction in order to maintain a fairly constant current through their associated load windings 14, 15. The split field reversible motor illustrated in conjunction with the circuit of Fig. 1 therefore, as explained hereinbefore, increases in speed in one direction as the variable tap 14 of potentiometer 6 is moved away from the center tap 9 on one side of the potentiometer 6 and increases in speed in the reverse direction as the variable tap 14 is moved away from the center tap 9 on the other side of the potentiometer 6.

In Fig. 3 the alternating current signal which is supplied to the control winding 5 of reactor 1 is derived from the alternating voltage source 7 by virtue of a Selsyn system comprising the driving Selsyn 26 and the control transformer Selsyn 27. The rotor 28 of the control transformer Selsyn 27 is maintained in a fixed position, and the amplitude and sense of the alternating signal induced therein is proportional to the magnitude and direction of the displacement of the principal movable rotor 29 with reference to stationary rotor 28. With no alternating current signal in the control winding 5 of reactor 1 there is no resultant control field in the second reactor 32 of the driven stage of magnetic amplification because of the cancellation of flux in the oppositely connected control windings 30, 31. However, since the load 40 of this second stage of magnetic amplification is connected as the diagonal of the bridge type rectification circuit 37 whose alternating current paths are connected in series relation with the reactance windings 33, 34 respectively, pulses of current flow through the load 40 in the same direction during a portion of each half cycle of source voltage. As a result, in the absence of control flux, the circuit operates about a direct current reference point. If a unidirectional control field is thereafter produced in a particular direction within the control leg of the reactor 32 of the second magnetic amplifier, this control field will accelerate the saturation point in the second reactor during each half cycle causing a greater current to flow through the load 40. It is also apparent that a unidirectional control field in an opposite direction will produce a corresponding retardation of the core saturation point of reactor 32 and a consequent reduction in the current supplied to the load 40. Since the direction and magnitude of the control field produced by the differentially connected control windings 30, 31 is a direct function of the relative displacement of the Selsyn rotors, the amount and direction of this load current is determined by this relative displacement. It will, of course, be appreciated that additional direct current biasing windings may be included on the reactor of the second magnetic amplifier 32 in order to control the "no signal" reference current through the load 40.

The operation of the circuits of Figs. 4 and 5 is identical with that of Fig. 3. Different types of filtering means are incorporated in each circuit however. In Fig. 3, filtering is accomplished by the flux maintaining action caused by the added inductance and resistance of the short-circuited windings 41 on the control leg of the core of the reactor 32. In Fig. 4, the combined impedance of resistors 42 and 43 and the control windings 30 and 31 cause the parallel connected capacitors 43 and 44 to charge during the period of current flow in each reactance winding circuit, and to maintain the current therein by discharging through these combined impedances after the current pulse has passed. The resistances 42 and 43 are, of course, chosen so that the time constant of the network is greater than the complete cyclical period. In Fig. 5, filtering is accomplished by the added inductances 46 and resistors 47 together with the inductance of the second reactor control windings in series with each reactance winding of the reactor 1. The time constant of this inductance-resistance network is again chosen so that each circuit follows only the slow variations in the average direct current level of its successive current pulses. However, because of the highly inductive load which is thereby connected to the reactance winding of reactor 1, the interruption of current by elements 16 and 17 in each reactance winding circuit may be prevented by an opposing voltage generated by the inductive load during the normally off portion of the alternating current cycle. The commutating rectifiers 45 and 46 are therefore included in the circuit to by-pass this opposing current and thereby to permit the current in each reactance winding to drop to zero during each cycle.

The basic operation of the circuit of Fig. 2 is also essentially the same as the operation of the circuits illustrated in Figs. 1, 3, 4 and 5. In Fig. 2 however the resistors 20 and 21 which comprise the load impedances of each reactance winding 3, 4 of the reactor 1 do not also comprise the ultimate load of the reactor 1 as in the case of the split field winding electromagnetic devices described above. Instead, they are employed to produce current pulses of determinable magnitude and phase. These current pulses are compared in the bridge type balancing circuit comprising resistors 20, 21, 23 and 24 across which the ultimate electrical load 25 is connected. The magnitude and direction of the current in the load 25 is a function of the differential of the current pulses through the resistors 20, 21. More specifically, pulses of current flow through each impedance element 20 and 21 in opposite directions during alternate half cycles of source voltage in the same manner as hereinbefore explained with reference to the circuits of Figs. 1, 3, 4 and 5. With no signal on the control winding 5 the currents through the resistors 20 and 21 are equal and opposite. The unidirectional components of these currents, which are produced at the corresponding impedance points 22 due to the filtering action of capacitors 18 and 19, are also, therefore, equal in magnitude and opposite in polarity with reference to the alternating current zero point. Since the resistors 23 and 24 which are connected in series between the impedance points 22 are identical in value, the point of connection between resistors 23 and 24 is at zero potential. As a consequence, no current flows through load 25 connected from side 7b of the alternating voltage source 7 to this midpoint connection. With an alternating current signal on the control winding, however, the magnitudes of the oppositely directed currents through the resistors 20 and 21 is unequal and the voltages at the impedance points 22 also are unequal. The voltage at the mid-connection between the balancing resistors 23 and 24 therefore is either positive or negative depending upon which reactance winding 3 or 4 passes the larger current. It is therefore apparent that current flows through load 25 in one direction or the other depending upon whether the alternating current control signal is in-phase or 180° out-of-phase with the alternating current source.

The effects of hysteresis in the saturable reactor 1 does not alter the operation of the magnetic amplifier circuits in the above described control systems. Core 2 is so constructed that sufficient flux is supplied from one outside leg of the core, when the reactance winding on that leg is conducting, to the other outside leg to reduce the flux density in the latter leg below the negative knee of the magnetization curve. Therefore, all of the core traces the outer hysteresis loop, which means that the effects of the magnetomotive force in the various load and control windings on the flux in the core are also uniform. It will be readily understood that other core shapes, such as toroidal for example, may be used instead of the three-legged core illustrated in the drawings, as long as the magnetic interaction of the reactance and control windings remains substantially the same.

It will be readily appreciated that the above described control systems are extremely sensitive due to the "push-pull" type of control action. A very small alternating current signal causes opposing current changes through each reactance winding circuit of the amplifier so that a considerable differential direct current component is produced in the load. It will also be appreciated that this push-pull action is obtained with a minimum of electrical components so that the circuits are simple and economical to construct.

While I have shown a particular embodiment of my invention, many modifications can be made, and I, therefore, intend in the appended claims to cover all such modifications as fall within the true spirit and scope of my invention.

What I claim as new and desire to secure by Letters Patent of the United States is:

1. A magnetic control system comprising a source of alternating voltage, variable impedance means connected to said source for deriving an alternating signal therefrom, a saturable reactor comprising a core member having a pair of reactance windings and a control winding, said control winding being connected to receive said alternating signal, an electromagnetic device having a pair of magnetic excitation windings, a pair of current rectifying devices, said rectifying devices being oppositely poled and connected in separate series circuit relation with respective ones of said reactance windings and of said excitation windings across said alternating voltage source, said reactance windings being so arranged on said core that the control winding flux due to said alternating signal aids one reactance winding flux but opposes the other reactance winding flux during alternate half cycles of source voltage to control the relative magnitude of the current in each series circuit, said excitation windings being connected in flux opposition to produce a differential magnetic excitation flux in said electromagnetic device responsive to said signal.

2. A magnetic control system comprising a source of alternating voltage, variable impedance means connected to said source for deriving an alternating signal therefrom of variable amplitude and sense, a saturable reactor comprising a magnetically permeable core member having a pair of reactance windings and a control winding, said control winding being connected to receive said alternating signal, an electromagnetic device having a pair of substantially identical magnetic excitation windings, a pair of current rectifying members, each of said rectifying members being oppositely poled and connected in separate series circuit relation with one of said reactance windings and one of said excitation windings across said alternating voltage source, and filtering means associated with each of said series circuits for deriving a unidirectional component of current in said excitation windings, said excitation windings being connected in said circuits so that the flux produced in said electromagnetic device by one excitation winding opposes the flux produced therein by the other excitation winding, said reactance windings being arranged on said core member so that the control winding flux due to said alternating signal aids the flux produced by one reactance winding but opposes the flux produced by the other reactance winding during alternate half-cycles of source voltage to increase the current in one excitation winding while decreasing the current in the other excitation winding to produce a differential magnetic excitation flux in said electromagnetic device whose magnitude and direction is dependent upon the amplitude and sense of said alternating signal.

3. A magnetic control system comprising a source of alternating voltage, variable impedance means connected to said source for deriving an alternating signal therefrom of variable amplitude and sense, a saturable reactor comprising a magnetically permeable core member having a pair of reactance windings and a control winding, said control winding being connected to receive said alternating signal, a pair of current rectifying members, an electromagnetic device having a pair of substantially identical magnetic excitation windings, a pair of series circuits respectively connected across said source, each comprising one of said reactance windings, one of said rectifying members and one of said excitation windings, said rectifying members being reversely connected to produce oppositely poled current pulses through each of said circuits during alternate half-cycles of source voltage, said reactance windings being arranged on said core member so that the control winding flux due to said alternating signal aids one reactance winding flux but opposes the other reactance winding flux during said alternate half-cycles to increase the current in one series circuit while decreasing the current in the other series circuit in response to said signal, said excitation windings being reversely connected with respect to each other in said circuits whereby a magnetic flux opposition is produced in said electromagnetic device, and filtering means associated with each of said series circuits for deriving a unidirectional component of said current pulses in said excitation windings to produce a differential magnetic excitation flux in said electromagnetic device whose magnitude and direction is dependent upon the amplitude and sense of said alternating signal.

4. A magnetic control system comprising a source of alternating voltage, variable impedance means connected to said source for deriving an alternating signal therefrom, a saturable reactor comprising a magnetically permeable core member having a pair of reactance windings and a saturation control winding, said control winding being connected to receive said alternating signal, an electromagnetic device having a pair of substantially identical magnetic excitation windings, a pair of current rectifying members, each of said rectifying members being oppositely poled and connected in separate series circuit relation with one of said reactance windings and one of said excitation windings across said alternating voltage source, said reactance windings being connected in said circuits to produce a unidirectional flux in said core member with respect to the bi-directional flux produced by said alternating signal in said control winding thereby to increase the current in one series circuit while decreasing the current in the other series circuit in accordance with said alternating signal, said excitation windings being oppositely wound with respect to each other to produce a magnetic flux opposition in said electromagnetic device, and filtering means associated with each of said series circuits for deriving a unidirectional component of current in said excitation windings to produce a differential magnetic excitation flux in said electromagnetic device responsive to said alternating signal.

5. A magnetic control system comprising a source of alternating voltage, variable impedance means connected to said source for deriving an alternating signal therefrom, a saturable reactor comprising a core member having a pair of reactance windings and a control winding, said control winding being connected to receive said alternating signal, a pair of current rectifying members, a magnetic amplifier stage including a second saturable reactor having a pair of saturation control windings, a pair of series circuits respectively connected across said source each comprising one of said reactance windings, one of said rectifying members and one of said control windings of said second saturable reactor, said rectifying members being reversely connected in said circuits to produce oppositely poled current pulses through each of said circuits during alternate half-cycles of source voltage, said last mentioned control windings being connected in said circuits to produce a flux opposition in said second saturable reactor, said reactance windings being connected in said circuits so that the flux produced by said signal in said control winding of said first reactor aids one reactance winding flux but opposes the other reactance winding flux during said alternate half-cycles, and filtering means associated with each of said circuits for filtering a direct current component of said current pulses to produce a differential control flux in said second saturable reactor responsive to said alternating signal.

6. A magnetic control system comprising a source of alternating voltage; variable impedance means connected to said source for deriving an alternating signal therefrom; a first saturable reactor comprising a core member having a pair of reactance windings and a control winding, said control winding being connected to receive said alternating signal; a magnetic amplifier stage including a second saturable reactor having a pair of control windings; a pair of current rectifying members, each of said rectifying members being oppositely poled and connected in separate series circuit relation with one of said reactance windings and one of said control windings of said second saturable reactor across said alternating voltage source, said reactance windings being connected in said circuits to produce a unidirectional flux in said core member with respect to the bi-directional flux produced by said alternating signal in said first mentioned control winding during alternate half-cycles of source voltage, said control windings of said second reactor being connected in said circuits to produce a flux opposition in said second reactor; and a short circuited winding on said second saturable reactor to filter a unidirectional component of the flux produced by each control winding of said second reactor.

7. A magnetic control system comprising a source of alternating voltage, variable impedance means connected to said source for deriving an alternating signal therefrom, a first saturable reactor comprising a three-legged core member having a pair of reactance windings on the outer legs thereof and a saturation control winding on the center leg thereof, said control winding being connected to receive said alternating signal, a pair of current rectifying members, a pair of resistances, a magnetic amplifier stage including a second saturable core member having a pair of saturation control windings, a pair of series circuits respectively connected across said source each comprising one of said reactance windings one of said rectifying members, one of said resistances and one of said control windings of said second saturable reactor, said rectifiers being reversely connected with respect to said source to produce oppositely poled current pulses through each of said circuits during alternate half cycles of source voltage, said reactance windings being connected to produce a unidirectional flux through said center leg of said core member whereby the relative magnitude of said current pulses is controlled by said alternating signal, said control windings of said second reactor being connected to produce a flux opposition in said second reactor, and a pair of capacitors each connected in parallel with the resistance and the control winding of the second saturable reactor in each of said circuits thereby to filter a direct current component of said pulses to produce a differential magnetic control flux in said second saturable reactor whose magnitude is dependent upon the amplitude of said alternating signal.

8. A magnetic control system comprising a source of alternating voltage, variable impedance means connected to said source for deriving an alternating signal therefrom, a first saturable reactor comprising a three-legged core member having a pair of reactance windings on the outer legs thereof and a saturation control winding on the center leg thereof, said control winding being connected to receive said alternating signal, a first pair of current rectification members, a pair of inductance elements, a pair of resistances, a magnetic amplifier stage including a second saturable reactor having a pair of saturation control windings, a pair of series circuits each separately connected across said source comprising one of said reactance windings, one of said current rectification members, one of said resistances and one of said last mentioned control windings, said rectification members being reversely connected with respect to said source to produce oppositely poled current pulses through each of said circuits during alternate half-cycles of source voltage said reactance windings being arranged on said core so that the flux produced in said center leg by said signal aids one reactance winding flux but opposes the other reactance winding flux during said alternate half-cycles, said control windings of said second reactor being connected in said circuits so that the flux produced by one winding opposes the flux produced by the other winding, and a second pair of current rectification elements each separately connected in parallel with the inductance, resistance and control winding in each of said circuits to provide a commutating low impedance path thereacross for inductive current produced in each of said circuits during the normally non-conducting period thereof.

9. A magnetic control system comprising a source of alternating voltage, variable impedance means connected to said source for deriving an alternating signal therefrom, a first saturable reactor comprising a core member having a pair of reactance windings and a saturation control winding, said control winding being connected to receive said alternating signal, a pair of current rectifying members, a pair of substantially equivalent impedance elements, a pair of series circuits connected across said source each including one of said reactance windings one of said rectifying members and one of said impedance elements, said rectifying members being oppositely poled to produce oppositely poled current pulses in each of said circuits during alternate half-cycles of source voltage, filtering means associated with each of said series circuits to derive a direct current component of said current pulses through each of said impedance elements, a pair of substantially identical resistances connected between corresponding impedance points in each of said circuits and a direct current consumption device connected from the point of connection between said last mentioned resistances to one side of alternating voltage source whereby a unidirectional current is produced in said consumption device whose magnitude and direction is responsive to the amplitude and sense of said alternating signal.

10. A magnetic control system comprising a source of alternating voltage, a self-synchronous Selsyn system connected across said source for deriving an alternating signal therefrom of variable amplitude and sense, a saturable reactor comprising a core member having a pair of reactance windings and a saturation control winding, said control winding being connected to receive said alternating signal, a magnetic amplifier stage including a second saturable reactor having a pair of saturation control windings, a pair of current rectifying members, each of said rectifying members being oppositely poled and connected in separate series circuit relation with one of said reactance windings and one of said control windings of said second saturable reactor across said alternating voltage source to produce current pulses through each of said circuits during alternate half-cycles of source voltage, said last mentioned control windings being connected in said circuits to produce a flux opposition in said second reactor, said reactance windings being connected in said circuits to produce a unidirectional flux in said core member with respect to the flux produced by said signal in said control winding whereby the relative magnitude of said alternate half-cycle current pulses are controlled in response to said signal, and filtering means associated with said circuits for filtering a direct current component of said current pulses to produce a differential control flux in said second reactor whose magnitude and polarity is dependent upon the amplitude and sense of said alternating signal.

11. A magnetic amplifier circuit comprising a pair of conductors for connection to an alternating voltage; a saturable reactor comprising a core member having a pair of reactance windings and a control winding; means connected between said conductors and said control winding for delivering an alternating signal to said control winding derived from an alternating voltage supplied to said conductors; a pair of rectifiers; a load including a pair of magnetic excitation windings; connections forming two circuits connected in parallel across said conductors, each circuit including a different reactance winding, a different rectifier, and a different magnetic excitation winding connected in series, said rectifiers having polarities such that said circuits are respectively conductive during opposite half cycles of the alternating voltage, said reactance windings being arranged to produce mutually additive flux in said core relative to the flux produced therein by a signal in said control winding, and said magnetic excitation windings being arranged in flux opposition to produce a differential magnetic flux responsive to said signal.

RAYMOND E. MORGAN.

REFERENCES CITED

The following references are of record in the file of this patent:

UNITED STATES PATENTS

| Number | Name | Date |
| --- | --- | --- |
| 2,100,715 | Jenks | Nov. 30, 1937 |
| 2,126,790 | Logan | Aug. 16, 1938 |
| 2,169,093 | Edwards | Aug. 8, 1939 |
| 2,179,299 | Murcek | Nov. 7, 1939 |
| 2,259,647 | Logan | Oct. 21, 1941 |